April 3, 1951      J. A. PAASCHE      2,547,884
SPRAY COATING APPARATUS
Filed July 20, 1944      11 Sheets-Sheet 4
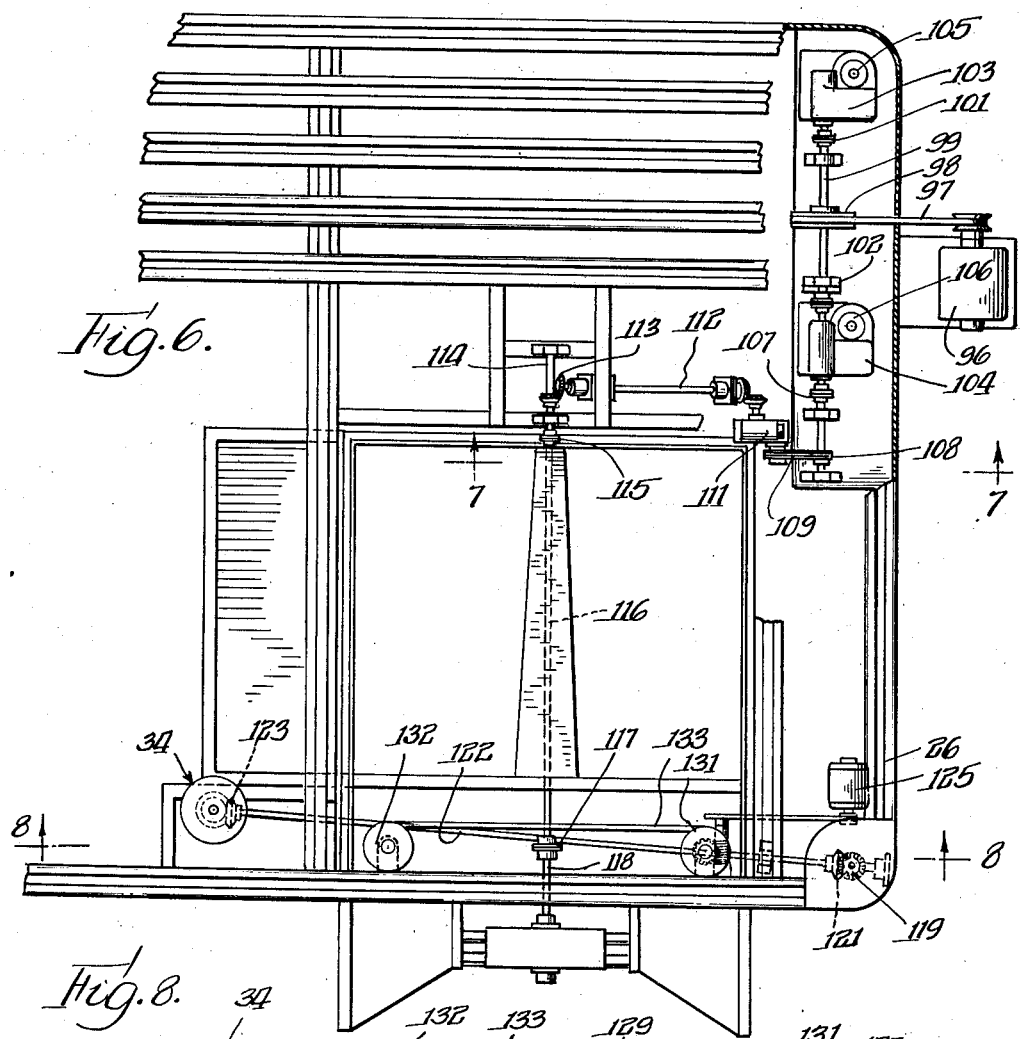
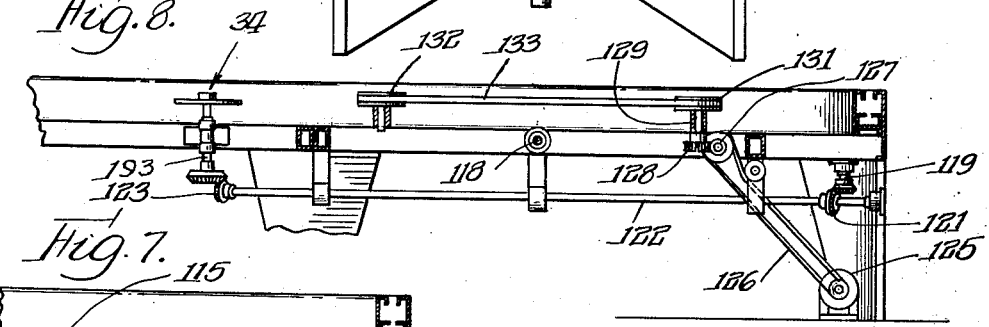
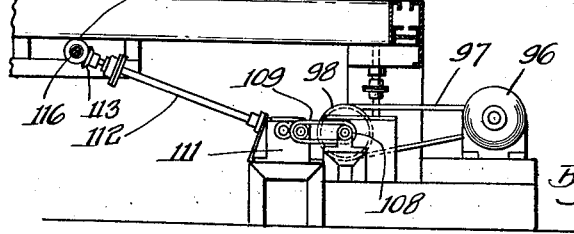
INVENTOR.
Jens A. Paasche

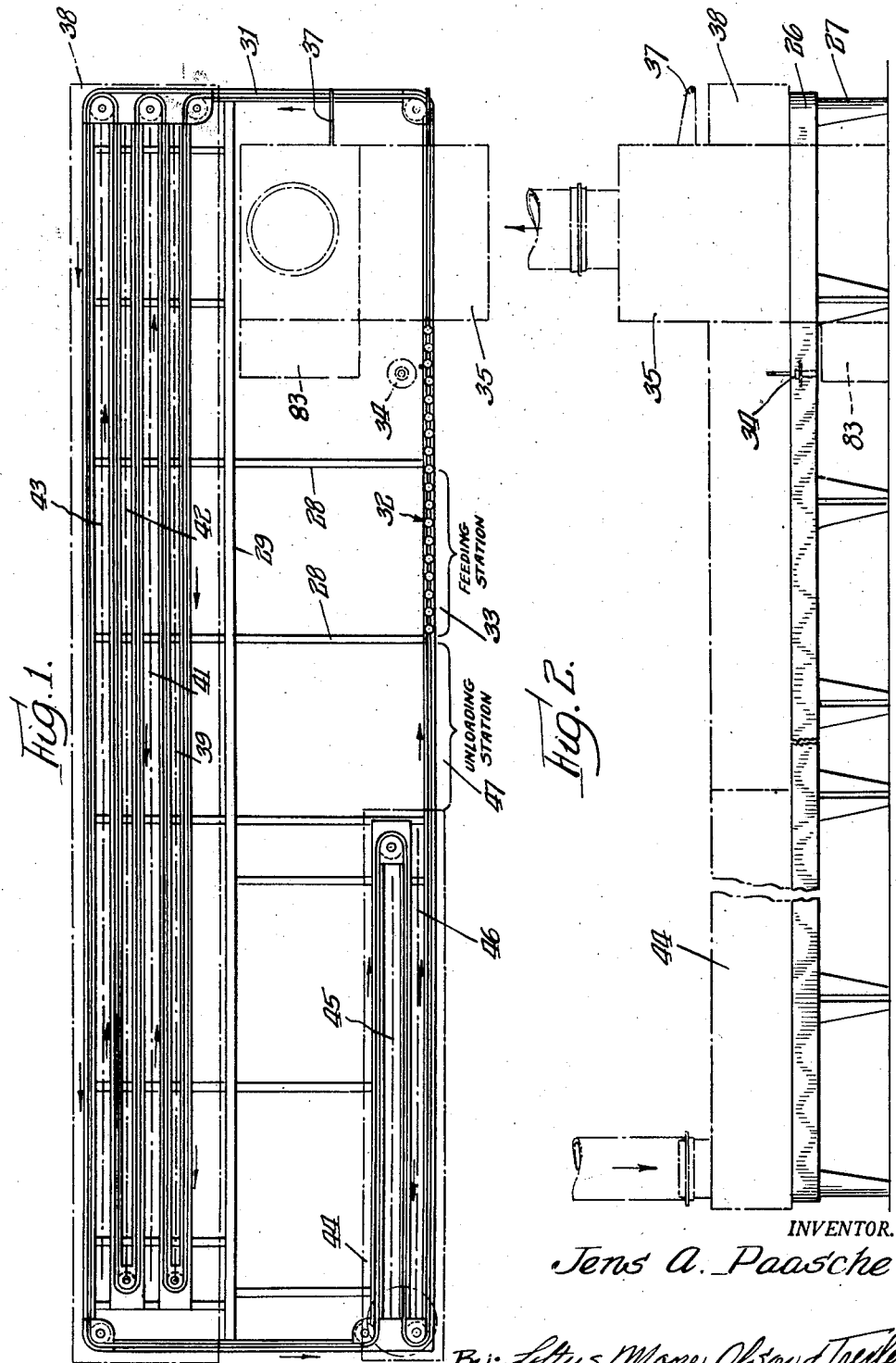

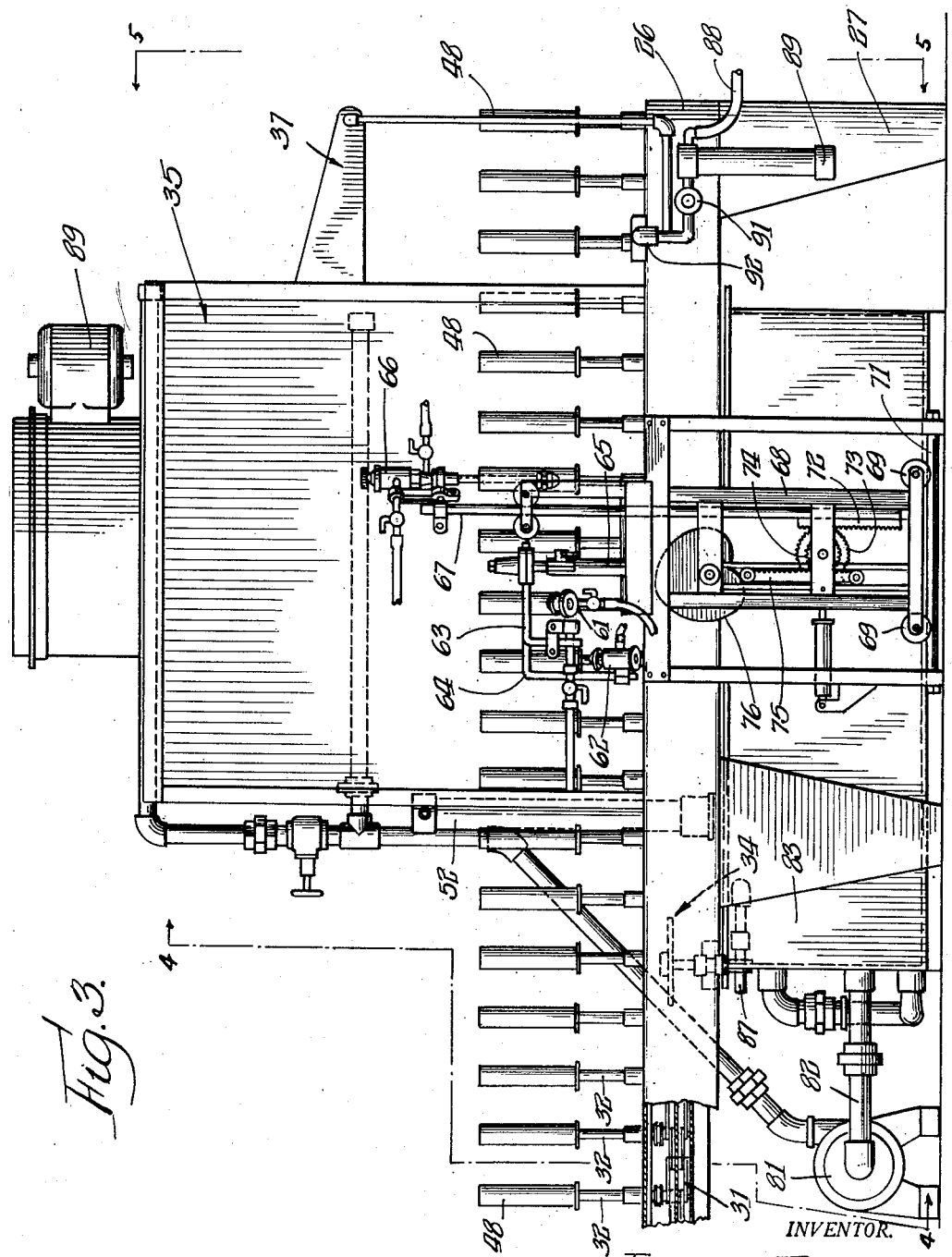

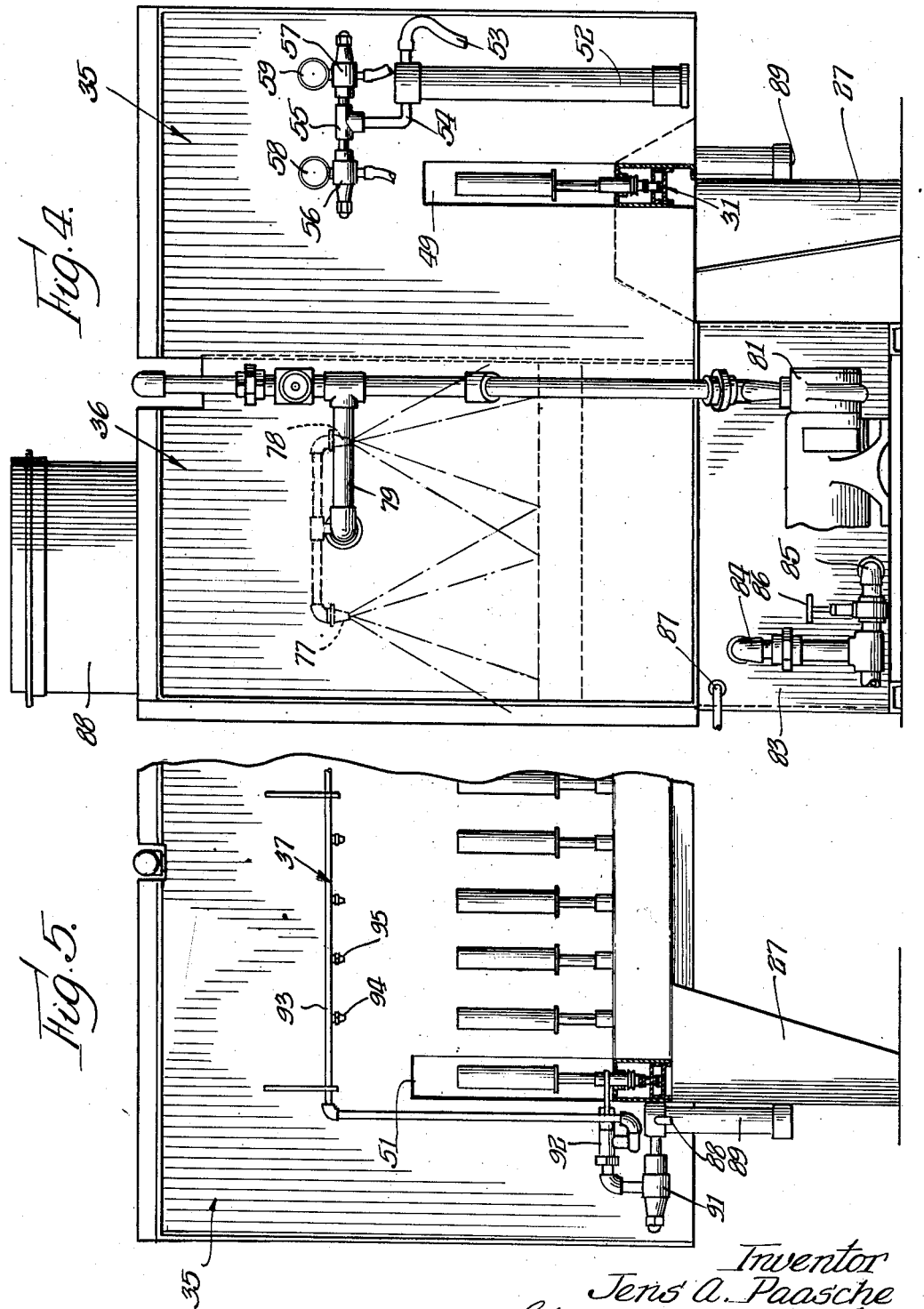

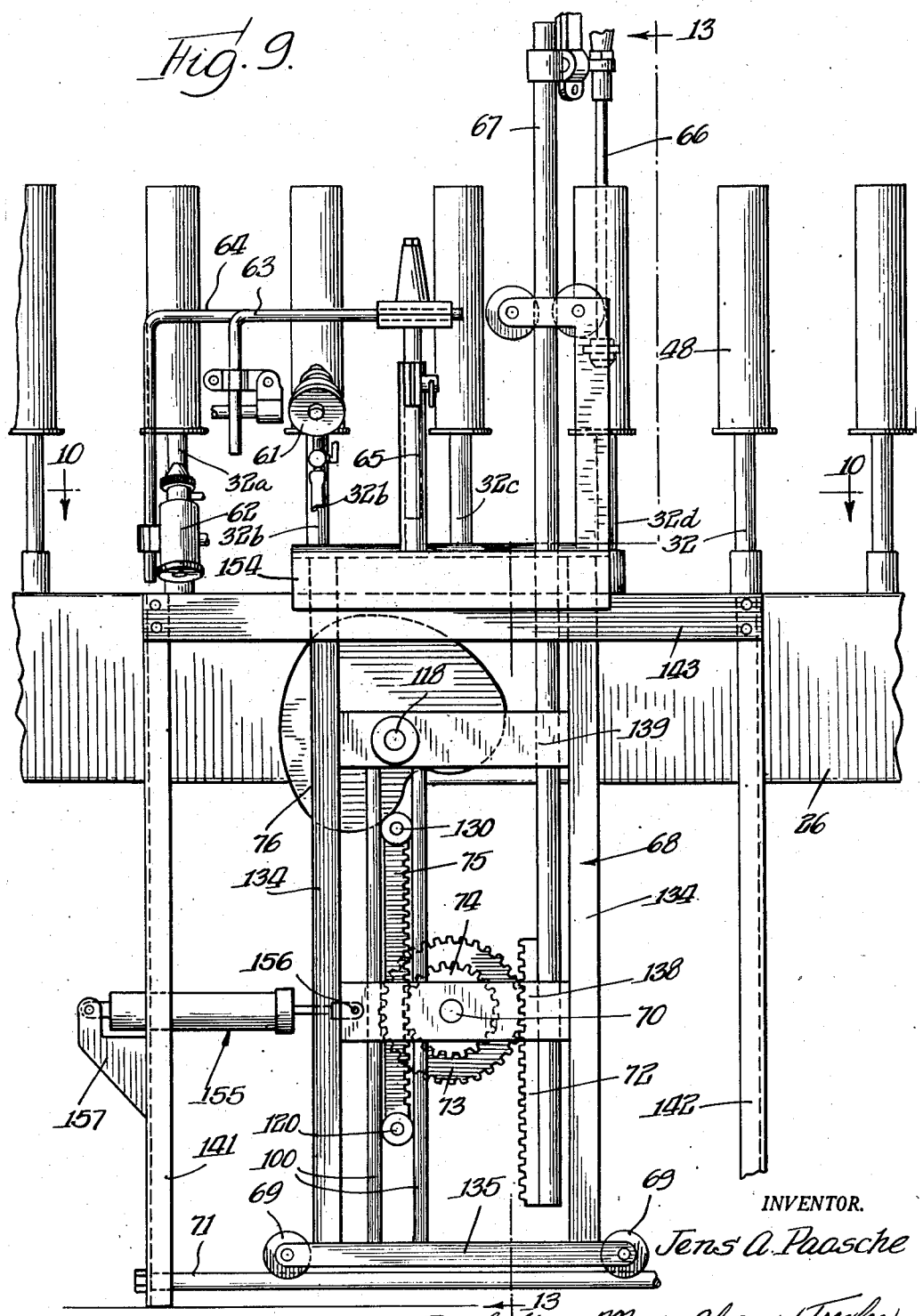

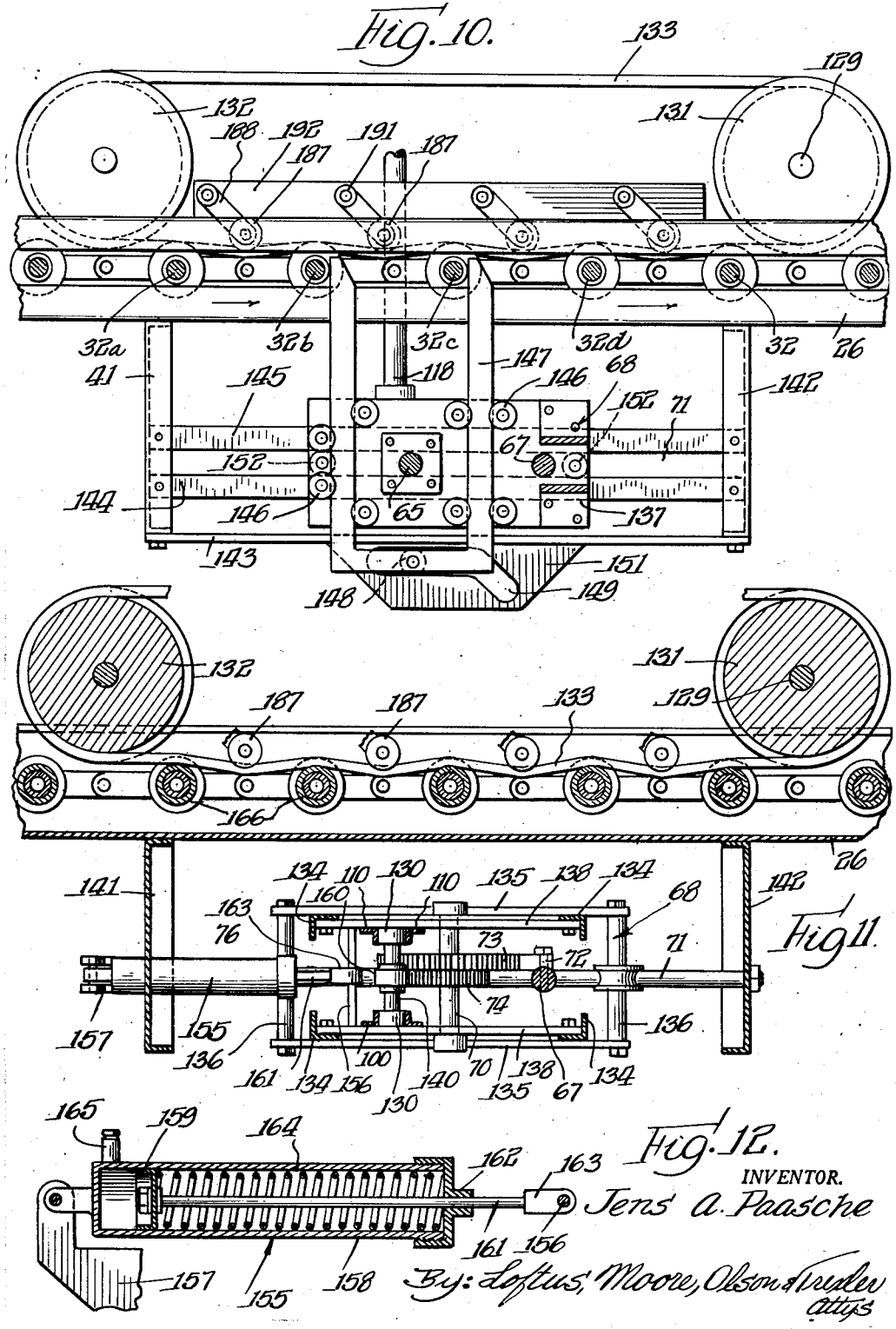

April 3, 1951 J. A. PAASCHE 2,547,884
SPRAY COATING APPARATUS
Filed July 20, 1944 11 Sheets-Sheet 7
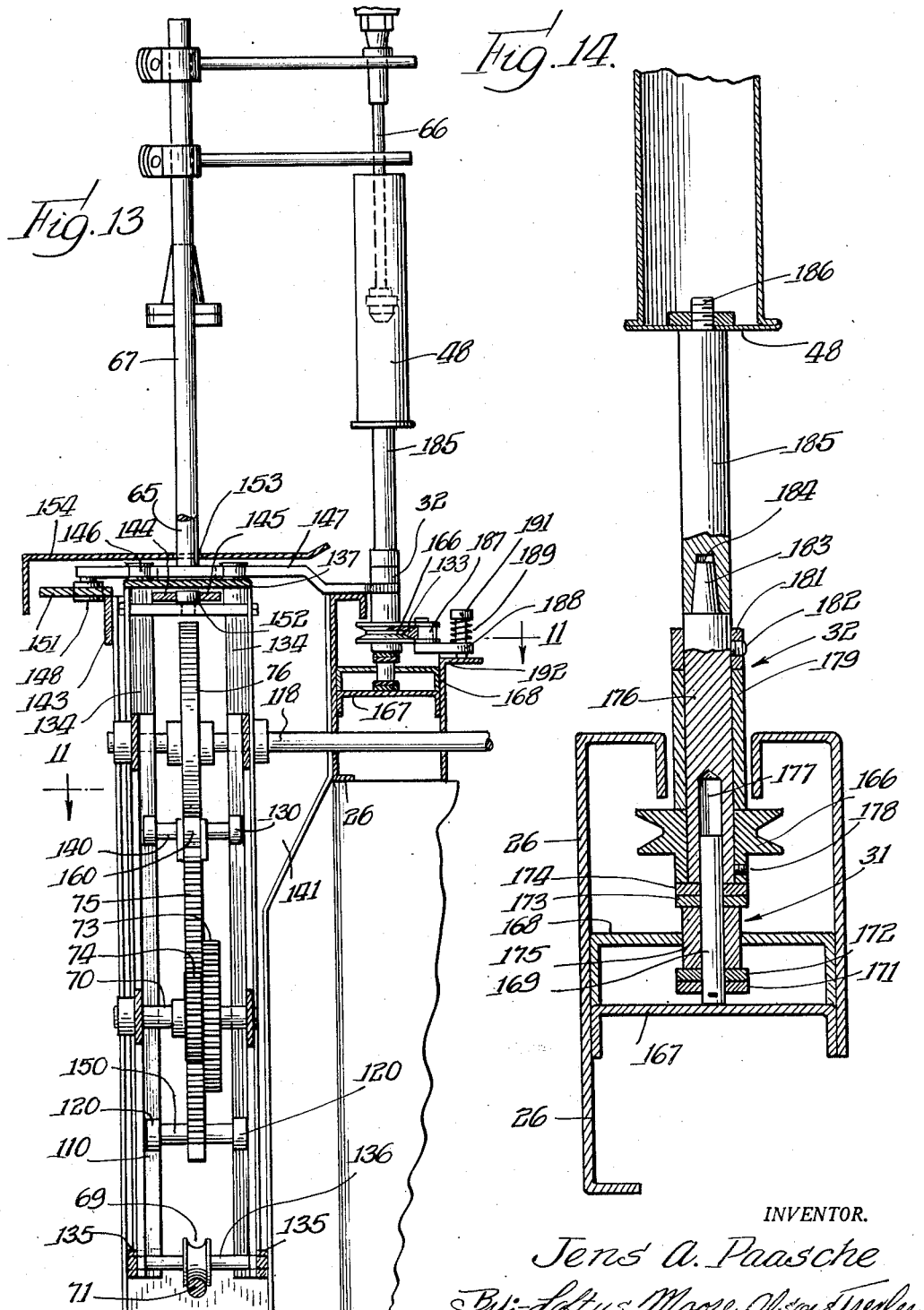
INVENTOR.
Jens A. Paasche
By: Loftus, Moore, Olson & Trexler
attys.

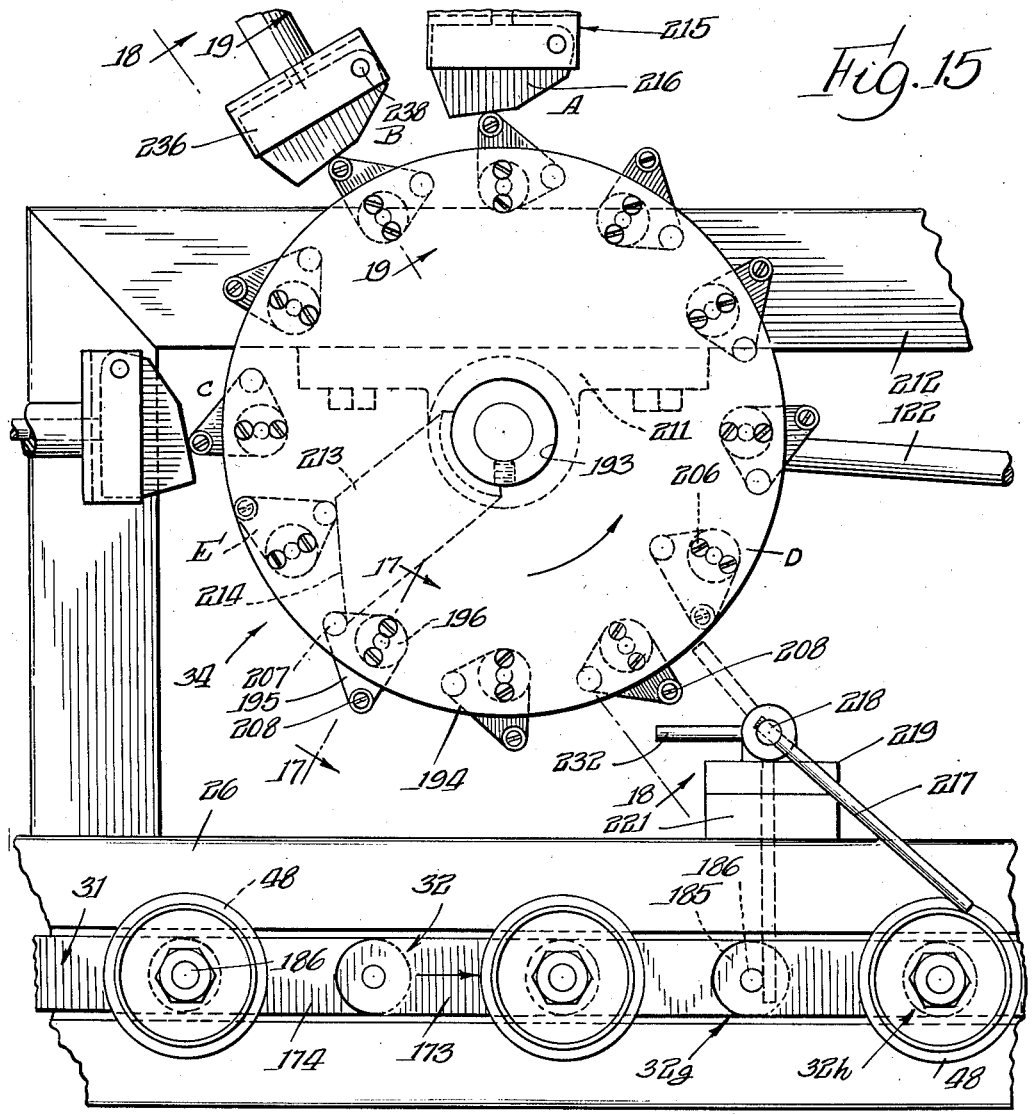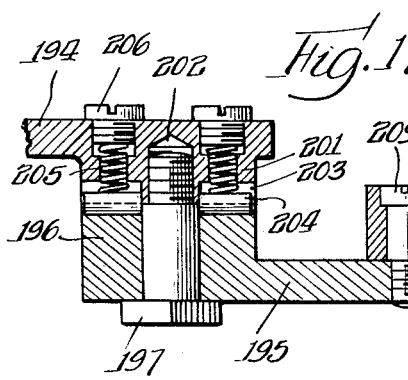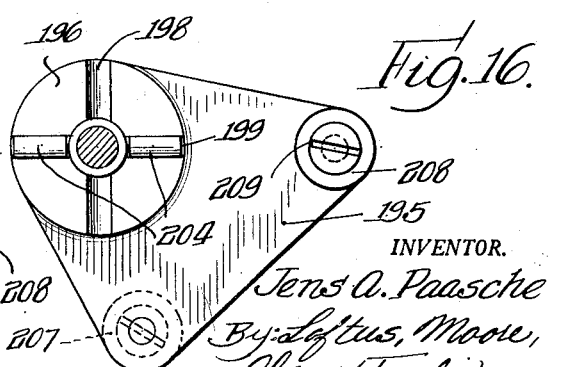

April 3, 1951   J. A. PAASCHE   2,547,884
SPRAY COATING APPARATUS
Filed July 20, 1944   11 Sheets-Sheet 9
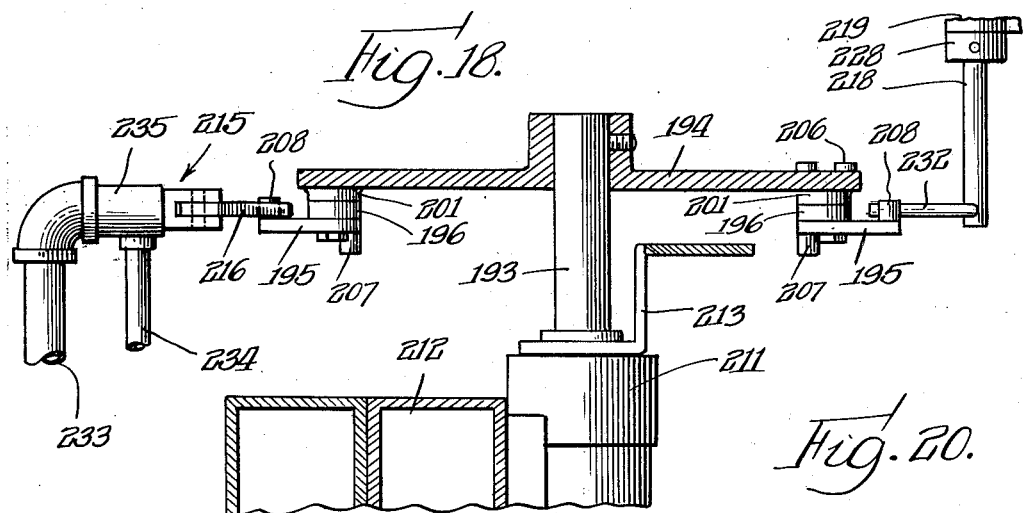
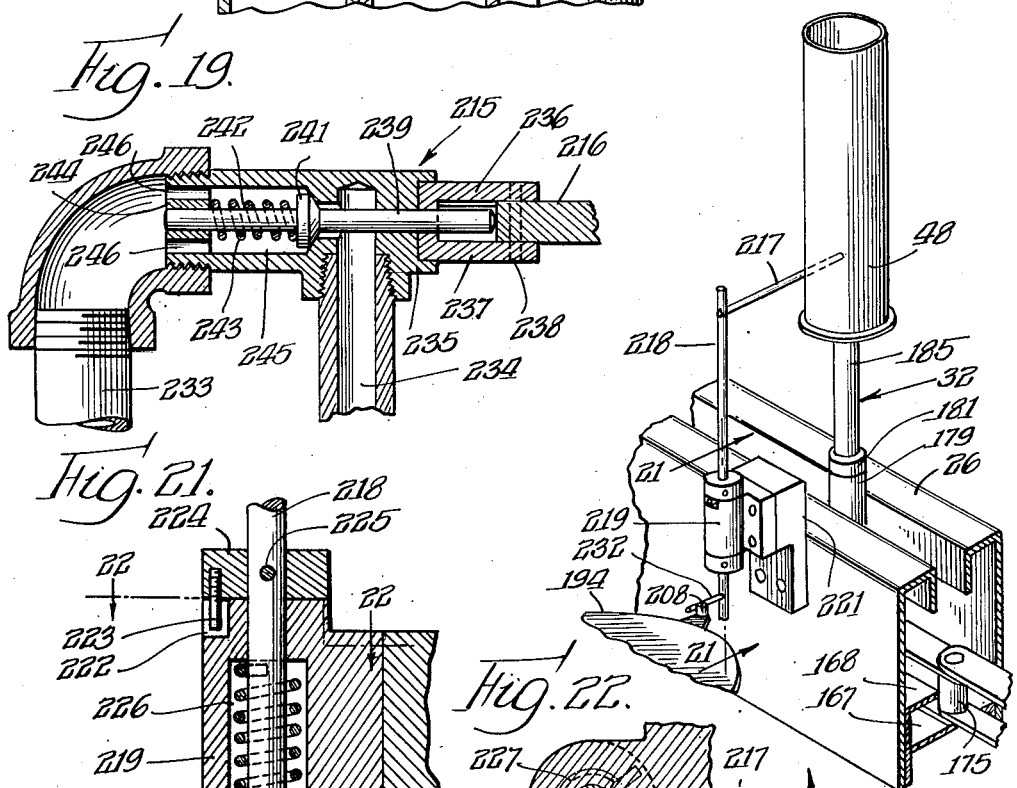
INVENTOR.
Jens A. Paasche
By: Loftus, Moore, Olson & Trexler
attys.

April 3, 1951 J. A. PAASCHE 2,547,884
SPRAY COATING APPARATUS
Filed July 20, 1944 11 Sheets-Sheet 10
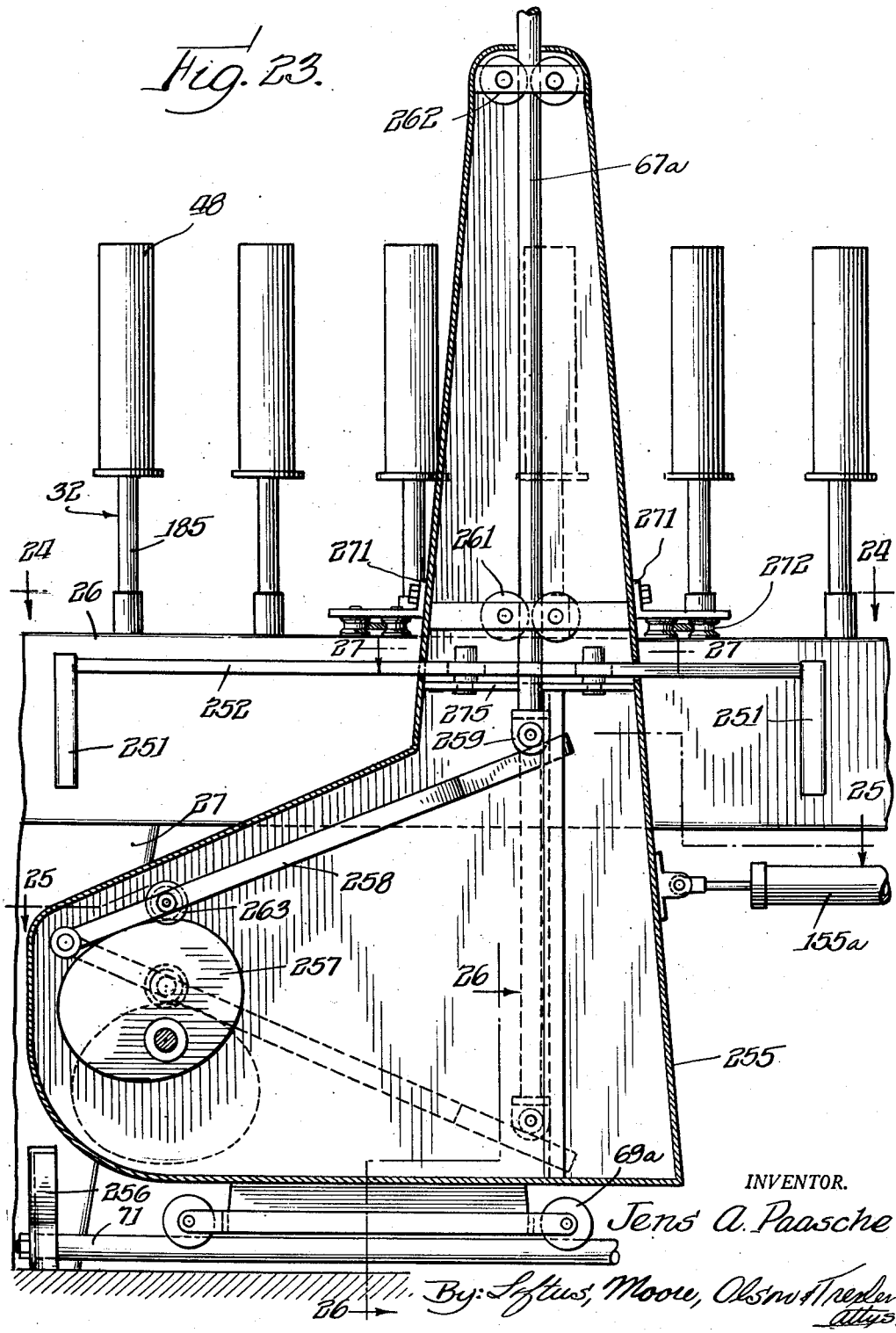
INVENTOR.
Jens A. Paasche
By: Loftus, Moore, Olson & Trexler
Attys.

April 3, 1951 J. A. PAASCHE 2,547,884
SPRAY COATING APPARATUS
Filed July 20, 1944 11 Sheets-Sheet 11
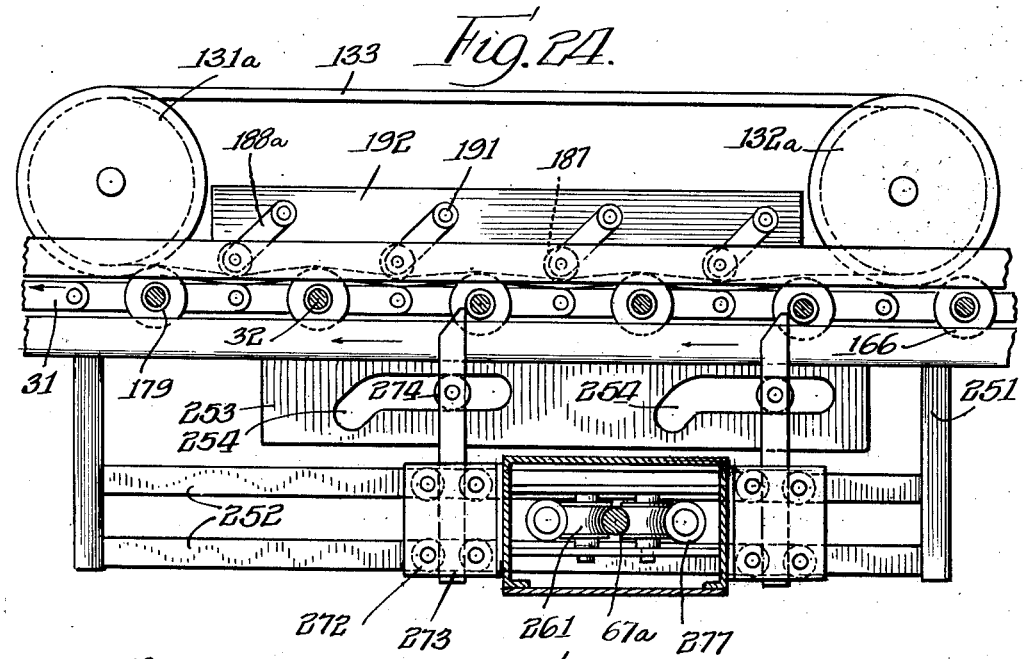
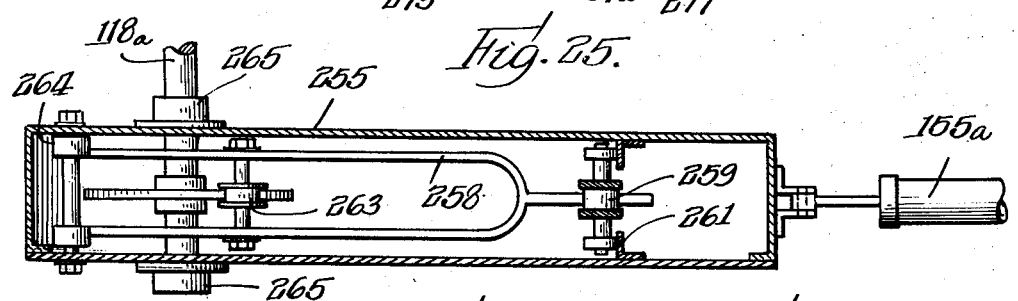
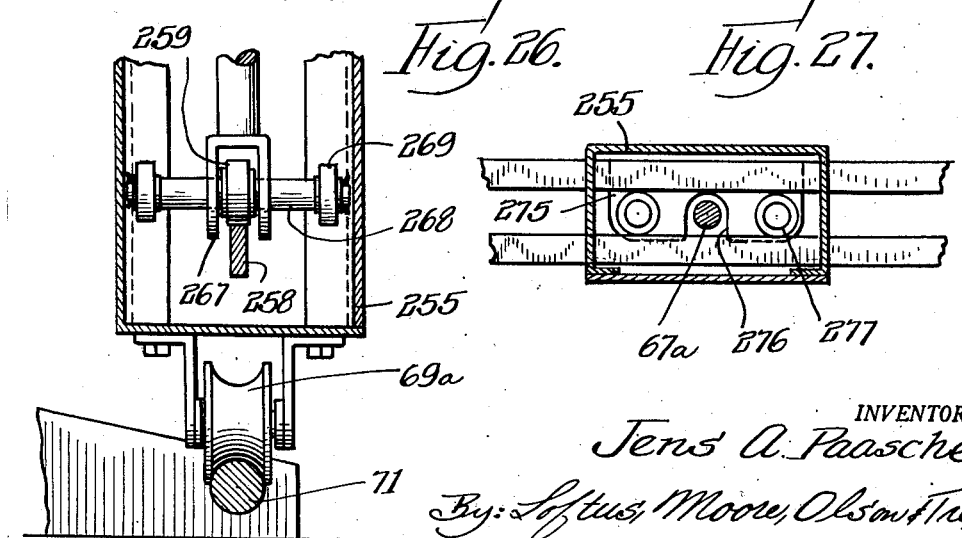
INVENTOR.
Jens A. Paasche
By: Loftus, Moore, Olson & Trexler
attys.

Patented Apr. 3, 1951

2,547,884

UNITED STATES PATENT OFFICE 2,547,884

SPRAY COATING APPARATUS

Jens A. Paasche, Chicago, Ill.

Application July 20, 1944, Serial No. 545,812

13 Claims. (Cl. 91—45)

The present invention relates to spray coating apparatus and more particularly to an improved continuous conveyor spray coating apparatus.

In the manufacture of a variety of products such as certain hollow articles requiring external and internal finishing, such as ammunition shell casing, etc., it is desired to protectively coat the interior and exterior surfaces with lacquer or paint. In accordance with the present invention this is accomplished with the minimum of labor and materials by the provision of a continuous conveyor system which is provided with a plurality of article supporting members for receiving the unfinished or uncoated articles and which conveys the articles through an automatic spraying chamber, an air cleaning apparatus, a drying chamber, and a cooling chamber. To conserve the paint or lacquer the automatic spraying apparatus is controlled by means which is responsive to the presence or absence of articles on the conveyor supports so that spraying takes place only when an article is in proper position relative to the spray guns or air brushes of the automatic spraying or coating apparatus. The control apparatus detects the presence or absence of articles on the conveyor supports and subsequently controls different spray guns to successively coat different portions of the articles passing through the spray-coating apparatus. It, therefore, is an object of the present invention to provide an improved continuous conveyor apparatus for coating internally and externally a variety of hollow articles of different sizes and shapes.

Another object of the present invention is to provide an automatic spraying or coating apparatus which operates only when articles are present and in predetermined positions within the apparatus.

A further object of the present invention is to provide an automatic spraying or coating apparatus which operates to coat successively different portions of the objects passing through the apparatus.

Still another object of the present invention is to provide in a continuous conveyor apparatus for spray coating hollow articles an automatic air cleaning apparatus responsive to predetermined positions of the articles for cleaning the interior of the articles with air or suitable cleaning fluids.

Other and further objects of the present invention subsequently will become apparent by reference to the following description taken in connection with the accompanying drawings wherein Figure 1 is a plan view of a continuous conveyor belt system;

Figure 2 is a front elevational view of the conveyor system shown in Figure 1;

Figure 3 is a front sectional view of the automatic spraying or coating apparatus and the air cleaning apparatus;

Figure 4 is a left side view of the paint wash booth and the automatic spraying apparatus shown in the direction of the arrows and along the line 4—4 in Figure 3;

Figure 5 is a partial right side view of the air cleaning apparatus seen in Figure 3;

Figure 6 is a partial plan view of the conveyor, drying, and article support rotating mechanism;

Figure 7 is a detailed view in the direction of the arrows along the line 7—7 of Figure 6;

Figure 8 is a detailed view in the direction of the arrows along the line 8—8 of Figure 6;

Figure 9 is a detailed side view of a portion of the spraying or coating mechanism shown in Figure 3;

Figure 10 is a view of the mechanism shown in Figure 9 as seen in the direction of the arrows along the line 10—10;

Figure 11 is a view of the mechanism of Figure 13 as seen in the direction of the arrows along the line 11—11;

Figure 12 is a cross sectional view of one element of the mechanism seen in Figure 9;

Figure 13 is a side view of the mechanism of Figure 9 as seen in the direction of the arrows along the line 13—13.

Figure 14 is a detailed view of a portion of the mechanism shown in Figure 13;

Figure 15 is a plan view of the spraying or coating control apparatus;

Figure 16 is a detailed view of one element of the apparatus shown in Figure 15;

Figure 17 is a cross sectional view of the element shown in Figure 16;

Figure 18 is a cross sectional view seen in the direction of the arrows along the line 18—18 of Figure 15;

Figure 19 is a cross sectional view of one element shown in Figure 15 as seen in the direction of the arrows along the line 19—19;

Figure 20 is a fragmentary perspective view of the spray control apparatus;

Figure 21 is a vertical section of a portion of the mechanism shown in Figure 20 along the line 21—21;

Figure 22 is a horizontal section of the mechanism shown in Figure 21 as seen in the direction of the arrows along the line 22—22;

Figure 23 is a side view partially in cross section of a modified form of structure generally serving the same function as the apparatus shown in Figure 9;

Figure 24 is a cross sectional view of the apparatus shown in Figure 23 as seen in the direction of the arrows along the line 24—24;

Figure 25 is a cross sectional view of the apparatus shown in Figure 23 as seen in the direction of the arrows along the line 25—25;

Figure 26 is a cross sectional view of the lower extremity of the housing and the lower extremity of the reciprocable shaft contained therein when the shaft is in its lowermost position as seen in the dotted line representation of Figure 23; and Figure 27 is a cross sectional view of a portion of the housing shown in Figure 23 as seen in the direction of the arrows along the line 27—27.

Referring more particularly to Figures 1 and 2 of the drawing there is shown rather diagrammatically a continuous conveyor system supported by a frame 26 mounted upon suitable legs 27, and reinforced by a plurality of cross members or beams 28 and 29. The frame 26 carries an endless chain 31 which is arranged to carry a plurality of article supports at regularly spaced intervals on suitable supporting stands or pedestals 32 through a plurality of stations or chambers. A certain area 33 adjacent the front of the frame 26 may be designated as the feeding or loading station where an operator will supply unfinished articles, such as ammunition shell containers, hollowware, etc., which are to be coated by a protective coating on the interior and exterior or either on the article supports 32. From the loading station 33 the conveyor chain 31 moves the articles past a control station 34 which is arranged to be responsive to the presence or absence of articles on the supports 32 so as to subsequently control the operation of an automatic spraying apparatus contained within a chamber indicated by the dotted line enclosure 35. The articles pass through the spraying chamber 35 which has associated with it a spray wash booth 36 and a vapor removing apparatus 37 positioned at the lower right hand corner of the frame 26. After the articles have been vapor cleaned, they are passed through a drying chamber 38 also indicated by a dotted line wherein the endless chain 31 passes back and forth between a plurality of baffle members 39, 41, 42, and 43. From the outlet of the drying chamber 38, the chain passes into a cooling chamber 44 which also is provided with a plurality of baffle members or partitions 45 and 46. The chain 31 leaves the cooling chamber 44 to pass along the front of the frame 26 past an area 47 which may be termed an unloading station.

By referring to Figures 3, 4, and 5 certain constructional details of the spray booth 35, the water washbooth 36 and the cleaning apparatus 37 will become apparent. The endless conveyor has a plurality of article supporting members 32 spaced at equal intervals along the endless chain 31 which moves articles to be coated such as ammunition shell cases 48 into an entrance opening 49 on the left side of the spray chamber 35, through the chamber 35 and out through an exit 51 on the right side of the spray booth 35 where the shell casings 48 move to the right end of the frame 26 and move in a direction at right angles to the front of the frame 26 so as to pass through a vapor removing station 37 located adjacent the right side of the spray booth 35. At the left side of the spraying booth 35, there is positioned a cleaning and dehydrating apparatus 52 which preferably is of the type disclosed in my copending application, Serial Number 489,211 filed May 31, 1943, now Patent No. 2,393,119, although any one of a number of other suitable types of apparatus might be utilized. The cleaning apparatus 52 is provided with an inlet connected through a suitable hose or conduit 53 which is connected to a source of aeriform substance under pressure which has not been shown for purposes of clarity since any conventional type of air compressor may be utilized. The air supplied by the hose conduit 53 passes into the dehydrating apparatus 52 and leaves through a pipe 54 which is connected by a T-connection 55 to a pair of regulator valves 56 and 57, which preferably are of the type described in my copending application, Serial Number 476,605, filed February 20, 1943, now Patent No. 2,398,503, for a fluid pressure regulator and which may be supplied with suitable pressure indicating gauges 58 and 59. The air pressure from one of the pressure regulating valves 56 is arranged to supply air to two spraying guns 61 and 62 mounted by suitable clamps upon arms or brackets 63 and 64 carried by a main support member 65. The delivery of the air from the regulator valve 56 to the spray guns 61 and 62 is controlled by a plurality of valves disclosed in detail in Figure 15 which are arranged to be operated in accordance with the control apparatus 34 the details of which will be described subsequently. The other pressure regulating valve 57 is arranged to supply air to another spray gun 66 which by suitable adjustable brackets is mounted in a desired position. The adjustable brackets are carried by a reciprocable support 67. The support members 65 and 67 are arranged to be moved parallel to the direction of the movement of the conveyor belt 31 and at the same rate by a movable carriage 68 having suitable wheels 69 traveling upon a track 71. The support 67 is connected to a rack 72 which engages a gear 73 which is connected to another gear 74 which is engaged by a rack 75. Rack 75 is actuated by a cam 76 so that periodically in accordance with certain predetermined positions of the carriage 68 the support 67 is elevated and lowered so that the nozzle end of the gun 66 moves up and down within one of the ammunition shell containers 48 thereby to coat the interior thereof. Further details of the operating mechanism for the carriage 68 and the spray guns will subsequently be described in connection with Figures 9 to 14.

Immediately adjacent the spray booth 35 is the water wash booth 36 which contains a plurality of spray nozzles 77 and 78 connected to a pipe 79 which is connected to a pump 81. The pump 81 is connected by a pipe 82 to a water tank 83 which is arranged to collect the water spray and the paint spray particles. The tank 83 of course may be provided with suitable overflow and drain outlets such as 84 and 85, the latter being provided with a shut off valve 86. The tank 83 furthermore may be connected to a source of water by a pipe 87. The upper portion of the water wash booth 36 is provided with a stack 88 which may have therein a suitable exhaust fan driven by a motor 89.

At the right side of the spray booth 35 there is provided the air cleaning apparatus 37 which includes a conduit 88 connected to a suitable source of aeriform substance under pressure and which is connected to an air cleaning and dehydrating apparatus 89 which is of a type similar to the apparatus 52 shown in Figure 4. The air cleaning apparatus 89 is connected to a pressure regulating valve 91 which is preferably of a structure similar to the valves 56 and 57 shown in Figure 4. The valve 91 is connected to a control valve 92 which is arranged to be actuated at predetermined intervals by portions of the supports 32 on the chain 31. The valve 92 is interposed between the pressure regulating valve 91 and an air conduit or pipe 93 provided with a plurality of nozzles 94 and 95 positioned at distances equal to the spacing between the article supports 32. Thus when the articles on the supports 32 are moved so as to be directly beneath the nozzles 94 and 95, the valve 92 is actuated so as to supply a blast of air directed downwardly into the interior of the shell casings 48 so as to exhaust therefrom any suspended spray vapor so that this vapor may not produce undesired results which might occur if the vapor were allowed to remain therein and be carried into the heated drying chamber 38.

The conveyor chain 31 and the spray gun elevating cam 76 of Figure 3 are driven by an arrangement of elements disclosed in Figures 6, 7, and 8. Referring more particularly to Figures 6 and 7, it will be seen that there is provided a motor 96 connected by a suitable belt 97 to a pulley 98 mounted on a shaft 99. The shaft 99 is connected through a plurality of coupling members 101 and 102 to gear boxes 103 and 104 by drive shafts 105 and 106 respectively. The drive shafts 105 and 106 are provided with suitable sprockets not shown which engage the endless chain belt 31. The one gear box 104 is also connected by a coupling 107 to a gear 108 which engages a chain belt 109 to drive a reduction gear 111 which is coupled to a drive shaft 112 connected by a bevel gear 113 to a shaft 114. The shaft 114 is connected to a universal joint or coupling member 115 to shaft 116 which in turn is connected through a universal coupling member 117 to a shaft 118 upon which the heart-shaped cam 76 is mounted. The universal joints 115 and 117 are provided so as to permit the shaft 118 to move a predetermined distance to the right and to the left of the position shown in Figure 6 which is brought about by the movement of the carriage 68 shown in Figure 3.

The endless chain 31 also passes about a suitable sprocket mounted on shaft 119 positioned at the lower right hand corner of the frame 26 as seen in Figure 6. From Figure 8 it will be seen that the shaft 119 is coupled through a suitable bevel gear 121 to a shaft 122 which in turn is coupled through bevel gears 123 to a shaft 193 which drives a member forming part of the paint spray control apparatus 34. Thus it becomes apparent that the paint spray control apparatus is driven in synchronism with the movement of the conveyor chain 31.

In Figure 8 there is also disclosed a motor 125 which is connected by a belt 126 to a pulley mounted on a shaft 127 which is connected through suitable gears 128 to a shaft 129 having mounted thereon a driving pulley or wheel 131. Another similar driven pulley 132 is provided and a belt 133 is connected about both the pulleys 131 and 132 so as to form a part of an apparatus subsequently disclosed in detail in Figures 10 and 11 for causing rotation of the article support members 32 as they pass through the automatic paint spray apparatus booth.

By referring to Figures 9, 10, 11, and 13, it will become apparent how the traveling carriage 68 which carries the support members 65 and 67 is arranged to move the spray guns 61, 62, and 66 along the table 26 in synchronism with the travel of the chain 31 and the support members 32 which carry the ammunition shell containers 48. The carriage 68 which is provided with rollers 69 is suitably formed of a plurality of angle iron upright members 134 positioned at four corners of a rectangle. At their lower extremities the angle irons 134 are suitably fastened and secured to horizontal members 135 which are interconnected at their extremities by the shafts 136 each of which supports one of the rollers 69 operating on the guide rail or track 71. At their upper extremities the angle irons 134 are secured to a plate 137 upon which is mounted the support 65. The frame 68 is furthermore reinforced by a plurality of horizontal members 138 and 139 which carry the shafts 70 and 118 respectively. The shaft 70 carries the gear 73 and 74; and the shaft 118 carries the heart-shaped cam 76. The transverse members 138 and 139 are provided with suitable bearing members for supporting these shafts.

Extending between the lower horizontal member 135 and upper horizontal cross member 139 of the frame 68 are two sets of angle iron guides 100 and 110 which are suitably secured to the members 135, 138, and 139. Each pair of guides such as the pair of guides 100 is arranged to serve as a guide channel for the upper and lower rollers 120 and 130 which are suitably supported from shafts connected to the gear rack 75. One such shaft 140 is visible in Figures 11 and 13 and the other such shaft 150 is visible in Figure 13. The upper end of the rack 75 is bifurcated so that a roller 160 may be mounted on the shaft 140 in between the bifurcated portion of the rack 75. The roller 160 serves as the cam follower for the cam 76.

The rod 71 which serves as a track for the wheels 69 of the movable carriage 68 is suitably supported from a frame having end members 141 and 142 interconnected at their upper extremities by a side plate member 143 and a pair of guide members 144 and 145. The upper ends of the end plates 141 and 142 extend forwardly as may be seen from Figure 13 so that they may be secured to the front side of the channel frame member 26.

The top plate 137 of the movable carriage 68 is provided on its upper side with a plurality of guide rollers 146 arranged so as to provide a guide for a U-shaped member 147 the legs of which extend forwardly so as to engage the article supporting members 32. On the under side of the closed end of the U-portion of the member 147 there is mounted a roller 148 which extends downwardly into a slot 149 formed in a plate 151 mounted at right angles to the horizontal member 143 of the stationary frame. Adjacent each end on the under side of the plate 137 there is mounted a roller 152 arranged to travel between the guide members 144 and 145. The plate 137 is provided with a suitable aperture through which extends the reciprocable support rod 67. The support rod 67 also extends through an aperture 153 in a cover plate 154 which is suitably supported above the plates 137 and 151 so as to protect the mechanism and to act as a safety guard.

The movable carriage 68 is interconnected with the end frame member 141 by a carriage return mechanism 155 having one member secured to a transverse bar 156 interposed between the two side plates 138, and being supported at the other end by a suitable bracket 157 secured to the end member 141. The device 155 is shown in greater detail in Figure 12 from which it becomes apparent that the device is formed of a cylinder having therein a movable piston 159 connected to a piston rod 161 extending through a suitable packing opening or bearing 162. The end of the rod 161 is connected by a coupling member 163 to the transverse rod 156 of a movable carriage 68. Interposed between one end of the cylinder 158 and the piston 159 is a compression spring 164 in which energy is stored when the movable carriage 68 has moved toward the right. When the U-shaped member 147 is disengaged from the support members 32 the energy in the spring 164 is sufficient to return the movable carriage 68 to its original position. In order to cushion the return of the carriage 68 the other end of the cylinder 158 may be provided with a suitably adjustable air vent 165.

It will be remembered from the description of Figure 6 that the shaft 118 upon which the heart-shaped cam 76 is mounted is driven in synchronism with the movement of the conveyor chain 131. The cam 76 therefore operates in synchronism with the travel of the conveyor chain so that the nozzle extremity of the spray gun 66 is lowered into one of the shell containers at the beginning of the travel of the carriage 68. In Figure 10 the carriage has begun to move forward as is apparent from the position of the roller 148 with respect to the left end of the slot 149 in the plate 151. It will be seen from Figure 9 that the spray gun 62 is positioned to coat the lower portion and the under side of a shell casing mounted on the support 32a. The gun 61 is arranged to spray the upper outside surface of a shell casing mounted on the support 32b, but no spray gun is associated with the shell casing on the support 32c. The nozzle end of the spray gun 66 is arranged to coat the interior of a shell casing mounted on the support 32d. The forward arms of the U-shaped member 147 are in engagement with the supports 32b and 32c to move the carriage 68 toward the right, and this movement continues until the roller 148 engages the right end of the slot 149 which causes the U-shaped member 147 to be moved between the rollers 146 away from the supports 32b and 32c. When the arms of the U-shaped member 147 have disengaged these supports the energy stored in the spring 164 of the device 155 causes the carriage to be moved to its original position so that the arms 147 during the next interval of operation will engage the supports 32a and 32b. The return of the carriage 68 to its original position by the mechanism 155 causes the roller 148 to retrace its path in the slot 149 of the stationary plate 151 so as to project the arms or ends of the U-shaped member 147 forwardly into the path of the supports 32a and 32b.

In order that the coating be applied evenly to the surfaces of the shell casings mounted on the supports 32 there is provided a belt 133 operating on the pulleys 131 and 132 which are driven from a shaft 129 actuated through suitable gears, pulleys, and a belt by a motor 125 as heretofore described in connection with Figures 8 and 6. The belt 133 is biased into engagement with the pulleys 166 associated with the supports 32 so that the supports will be rotated. Reference may now be had to Figure 14 which shows certain details of the chain guide channel 26, the endless conveyor chain 31, and the article supports 32. The channel 26 is provided with a bottom bed plate 167 above which is spaced a slotted channel plate 168 which serves as a guide for the conveyor chain 31. The conveyor chain is composed of a plurality of links and pivots, and a cross section of the chain at one of the pivots is shown in Figure 14. The pivot comprises a shaft 169 on which is supported one end of a rear bottom link member 171 and above which is mounted a front bottom link member 172. The bottom link members 171 and 172 are spaced from top link members 173 and 174 by a spacer 175 having a diameter slightly less than the slotted opening in the channel guide 168. The pivot shaft 169 extends above the upper length 174 a considerable distance so as to support a cylindrical member 176 having at its bottom end an aperture or bore 177 of such size as to fit closely about the upper end of the pivot rod 169. Adjacent the lower end of the cylinder member 176 is mounted a pulley 166 which is secured thereto by suitable means such as a set screw 178. Immediately above the pulley 166 there is positioned a rotatable sleeve 179. The sleeve 179 facilitates the rotation of the member 176 and the members mounted above this member when the legs of the U-shaped member 147 shown in Figures 10 and 13 are in engagement with the rotatable sleeve 179. The rotatable sleeve 179 also minimizes wear whenever the assembly 32 tends to engage the slotted channel opening of the guide member 26. The sleeve 179 is retained in position by a collar 181 secured to the upper end of the cylindrical member 176 by a set screw 182. The upper end of the cylindrical member 176 is provided with a frusto-conical portion or tapered member 183 which is arranged to engage a complementary frusto-conical opening 184 in the lower end of a cylindrical member 185. The cylindrical member 185 has a reduced end portion 186 which projects into the apertured end of a shell casing 48.

As may be seen from Figure 13 the pulley 166 engages a belt 133 which passes about the pulleys 131 and 132. The belt 133 is retained in engagement with the pulleys 166 by a biasing arrangement comprising a plurality of idler rollers 187 mounted on the outer extremities of arms 188 which are urged toward the belt 133 by springs 189 surrounding supporting pins 191. The pins 191 are mounted on an outwardly turned portion 192 of the back side of the channel member 26. Each of the supporting members 32 as it comes in the vicinity of the left pulley 132 is engaged by the belt 133 so that the support and the shell casing mounted thereon are rapidly rotated.

Reference may now be had to Figures 15 to 22 from which the construction and operation of the spray control device 34 will become apparent. The spray control device 34 is driven by a shaft 122 in synchronism with the movement of the conveyor chain 31. The shaft 122, as will be remembered from the description of Figure 6, is connected through bevel gears 123 to a shaft 193 which is connected to a circular plate 194. The circular plate 194 supports from its under side a plurality of cam actuators 195 shown in detail in Figures 16 and 17. The cam actuator 195 is generally triangular in shape and at one corner is provided with a bearing portion 196 so that the actuator 195 may be pivotally mounted on a bearing stud or cap screw 197 on the under side of the plate 194. The bearing portion 196 extends upwardly above the remainder of the triangular cam actuator member 195, and is generally circular in configuration. The top surface of the bearing portion 196 is provided with transverse semi-cylindrical grooves 198 and 199 arranged at right angles to each other. At spaced intervals the circular plate 194 is provided with depending circular stud portions 201 having central threaded apertures 202 for receiving the threaded ends of the cap screw members 197. The lower surface of the member 201 is provided with a transverse groove 203. Each portion of the transverse groove 203 is provided with a movable member 204 arranged to cooperate with the groove 203 and the corresponding portion of either of the grooves 198 or 199 on the top surface of the bearing portion 196 of the cam actuator 195. The members 204 are each biased downwardly by a compression spring 205 mounted within suitable apertures in the depending stud portion 201 and retained in position by cap screw members 206. The members 204 biased by the springs 205 therefore operate as a frictionally retained key which however may be displaced if sufficient force or torque is applied to the cam follower 195. In the other two corners of the triangular plate 195 there are provided rollers 207 and 208 each of which is secured in position by a combined bearing pin and cap screw fastening device 209 having a threaded end in engagement with a threaded aperture in the plate 195. The roller 207 is mounted so as to depend from the plate 195 whereas the roller 208 is mounted so as to project above the plate 195. The roller 207 serves as a reset device whereas the roller 208 operates as an actuator for each of a plurality of cam operated valves for controlling the supply of air and spray material to the various guns mounted within the spraying chamber.

Referring more particularly to Figure 15, it will be seen that the shaft 193 to which the circular plate or disk 194 is attached is mounted in a bearing member 211 suitably secured to a supporting framework 212 which may be connected to the main framework of the apparatus which includes the channel member 26. At the top of the member 211 there is mounted a reset cam 213 having a cam surface 214 arranged at such an angle as to engage the rollers 207 of any member 195 which previously may have been moved into inactive position. The control plate 194 moves in a counter clockwise direction and at various points of equal angular displacement there are positioned a plurality of cam actuators 195. Adjacent the periphery so as to be engaged by the roller 208 of a cam actuator 195 there are positioned at various angular displacements a plurality of control valves 215 the construction of which is shown in detail in Figures 18 and 19. Each of the valves 215 is provided with a cam member 216 arranged to operate a spring biased valve member so as to permit air and material to be supplied to one of the spray guns in the spray booth. Portions of each of the control valves 215 are shown in Figure 15, and the control valve first to be encountered located at position A controls the spray gun 62 of Figure 9 so as to coat a device positioned on the support 32a. The next control valve at position B is arranged to control the spray gun 61 which is arranged to coat the article supported on the support 32b. A third control valve located at position C controls the operation of the spray gun 66 arranged to coat the interior of the article supported on the support 32d. At another point adjacent the periphery of the control disk 194 there is positioned a device responsive to the presence or absence of articles mounted on the supports 32 of the endless chain 31. This device includes an arm 217 mounted at right angles on a rotatable shaft 218 so as to be in the path of articles such as ammunition shell containers 48 mounted on the devices 32 as may be seen from the position of the rod 217 in the lower right hand portion of Figure 15 and from the position of the rod as seen in Figure 20. The rotatable rod 218 is mounted in a bearing member 219 secured by a bracket 221 to the upright inside surface of the channel member 26. The bearing member 219 is provided with a portion of an annular slot or recess 222 for receiving a pin 223 carried by a collar 224. The collar 224 is rigidly secured to the rod 218 by suitable means such as a pin 225. The collar 224 is positioned immediately above the top of the bearing member 219 so that the pin 223 will limit the annular displacement of the rod 218 to a certain predetermined angle. The inside of the bearing member 219 is provided with a hollow bore 226 so that a torsion spring 227 may be mounted therein. One end of the torsion spring 227, such as the bottom end, is secured to the bearing member 219. The other end, such as the upper end of the spring, is secured to the rod or shaft 218 so as to bias the rod to a particular position which is determined by the pin 223 engaging one end of the slot 222. Immediately below the bearing member 219 there is provided a collar 228 having a reduced portion 229 extending upwardly into the bore 226. The collar 228 is also secured to the rod or shaft 218 by a member such as a pin 231. The rod 218 extends down below the collar 228 a distance sufficient to support the rod 232 at right angles thereto at such elevation as to come within the path of the roller 208 of a cam actuator 195.

When the rod 217 is engaged by an object such as the ammunition shell container 48 carried by the support 32h, the movement of the container by the conveyor chain 31 causes the rod 218 to be moved so that the lower arm 232 is moved out of the path of the on coming roller 208 of the next cam actuator 195 so that the cam actuator will remain in its effective position so as to actuate a control valve 215 as is the case with the cam actuator indicated at the position A. If, however, a support such as the support 32g does not have an article thereon a support 32 passes under the arm 217 which is biased to the dotted line position shown in Figure 15. With the rod 217 in this position, the lower rod 232 is in the dotted line position shown where it may engage the on coming roller 208. Due to the engagement of the pin 223 with one end of the slot 222 in the bearing member 219 the rod 232 is not susceptible to further movement in a clockwise direction as viewed in Figure 15 and hence the rod 232 will bring about a displacement of the cam actuator 195 so that the cam actuator will be moved inwardly to a position such as illustrated at D. A cam actuator in such position therefore will be ineffective to bring about operation of any of the air control valve devices 215 and hence when the support 32g passes the various guns, these guns will not be caused to spray. After each of the cam actuators 195 have passed the proximity of the arm 232, they will remain in their adjusted positions by virtue of the retaining action of the coil springs 205 on the keys 204 operating in the slot 203 of the member 201 and in either of the slots 198 or 199 of the member 196, shown in Figures 16 and 17. After each of the cam actuators 195 has passed the last control valve which is located at position C the ineffective cams are reset by the engagement of the roller 207 with the cam surface 214 of the reset device or arm 213. The cam surface 214 has such length and configuration that when the roller 207 reaches the end of the cam surface 214, the cam actuator 195 has been rotated through an angle of ninety degrees so that the slots 199 are directly beneath the slots 203.

Referring more particularly to Figures 18 and 19 it will be seen that the valve structure 215 which is provided with a cam actuator 216 controls the flow of an aeriform substance from an inlet conduit or pipe 233 to an outlet conduit or pipe 234. The valve 215 has a body portion 235 which supports upper and lower plates 236 and 237 between which the cam 216 is secured by a suitable pin 238. The inner surface of the cam 216 bears against the end of a rod or valve stem 239 which supports a valve head 241. At the other side of the valve head 241 there is a guide stem 242 which is surrounded by a spring 243 arranged to bias the valve head 241 toward closure. One end of the spring 243 engages the under side of the valve head 241 and the other end of the spring engages a member 244 which serves as a bearing support member for the end of the valve guide member 242. The member 244 may comprise an insert positioned within a bore 245 in the body 235. The member 244 therefore would have a central opening for receiving the end of the rod 242 and a plurality of circumferentially spaced passages or openings 246 through which air from the conduit 233 may be supplied to the inner bore 245. When the cam member 216 pushes the valve stem 239 inwardly so as to displace the valve head 241 from its cooperating seat, air from the passage 245 of the body 235 passes through the valve port to the outlet passage or conduit 234. Thus for a certain angular displacement of the roller 208 of the cam actuator 195, the cam 216 is actuated inwardly and retained in that position for a predetermined time interval. This time interval is sufficient to permit the associated controlled spray gun to coat its allotted surface portion of the hollow container or article 48. The device shown in Figure 15, therefore, is responsive to the presence or absence of the articles on the supports of the conveyor chain for subsequently controlling the operation of the guns in the spray chamber at the time when the article supports are in proper position in front of the various guns in the spray chamber. Since the reset cam 213 always actuates the cam actuators 195 to an effective position, the absence of an article on a support such as 32g causes the lever 232 to render ineffective a cam actuator so that at predetermined times the various spray guns in succession will remain inoperative as the vacant support 32g passes through the spraying chamber.

In Figures 9 to 13 inclusive, certain details are shown of a mechanism for raising and lowering one of the spraying brushes or guns 66 to coat the interior of containers such as the articles 48. The apparatus provided includes a movable carriage 68 which also moves spray guns 61 and 62 in synchronism with the movement of the articles 48 so as to coat certain portions of the exterior of the hollow articles. If it is desired to vary the up and down movement of the spray gun 66 to accommodate longer or shorter hollow articles such as 48 the cam 76 may be replaced by a different sized cam. It, however, has been found that for greater versatility in the application of the apparatus where various sized objects are apt to be coated by the machine, that a simpler arrangement is desirable for raising and lowering the spray gun 66. Therefore in Figures 23 to 27 inclusive another arrangement has been shown for coordinating the movement of the spray guns in accordance with the movement and sizes of the hollow articles 48 being moved by the conveyor 31. In order to simplify the disclosure and to facilitate the association of the modified apparatus shown in Figures 23 to 27 with the apparatus shown in previous figures, similar elements and devices have been given correspondingly similar reference characters; and other corresponding devices which, however, may be slightly modified or reversed in position have been given similar reference characters with the addition of the letter "a."

Referring to Figures 23 and 24 it will be seen that the member 26 which houses the conveyor 31 has attached thereto a pair of brackets 251 which support a pair of rails 252 therebetween. Supported from the member 26 is also a horizontally extending plate 253 having therein two similar apertures 254. The rails 252 and the apertures 254 of the member 253 serve to guide and control the operation of an apparatus having a vertically reciprocable horizontally shiftable member 67a arranged to support a spray gun such as the gun 66 shown in Figure 9. This apparatus includes a housing 255 suitably supported by rollers 69a operating upon a rail 71 retained in position by brackets 256 which may be secured to suitable support members such as the support legs 27. Within the housing 255 there is located a cam 257 arranged to actuate a lever 258 which in turn engages the follower roller 259 secured to the lower extremity of the shaft 67a. The shaft 67a is suitably supported between two sets of rollers 261 and 262 arranged in spaced apart relation within the housing 255.

From Figure 25 it will be noted that the lever 258 has a U-shaped portion supporting at an intermediate point a cam follower roller 263. The lever 258 is pivotally supported by a suitable structure such as that shown at 264. The cam 257 which bears against the cam follower roller 263 is mounted upon that portion of the shaft 118a which extends to the interior of the housing 255 and is supported therein by suitable bearing members 265. The shaft 118a corresponds to the shaft 118 shown in Figures 9 and 10 which it will be recalled is actuated from a suitable source of power as generally illustrated in Figure 6. The entire housing 255 is arranged to move in reciprocable manner along the rail 71 and periodically is returned to its initial position by the use of a carriage return mechanism 155a which has one end secured to the housing 255 and the other end secured to a suitable stationary support or bracket.

From Figures 23, 25, and 26 it will be noted that the lever follower 259 comprises a roller housed within a U-shaped portion 267 mounted therebetween laterally extending portions 268 each of which is terminated with a roller 269. The rollers 269 are arranged to engage vertical guide rails or bars 261 secured to the sides on the interior of the housing 255.

From Figures 23 and 24 it will be seen that at an intermediate point between the top and bottom of the housing a pair of brackets 271 are provided each of which is arranged to guide a transversely reciprocable bar member 273 having at an intermediate point thereon a depending roller 274 arranged to engage and travel within the aperture 254 in the horizontally extending plate 253. The forward extremity of the bar 273 is arranged to be engaged by the portion 179 of the article support 32. The arrows seen adjacent the conveyor chain 31 in Figure 24 indicates that the direction of movement of the conveyor chain is opposite to that direction illustrated in the embodiment shown in Figure 10. Consequently the pulleys 131 and 132 are reversed in position and have been given the reference characters 131a and 132a. Likewise the levers 188a are reversed in position so that the rollers 187 may engage the belt 133 to bias the belt toward the pulley members 166 which serve to rotate the article supports 132.

By reference to Figure 27 it will be seen that a short distance below the lower set of rollers 261 which serve to guide and support the rod 67a the housing 255 is provided with a plate 275 positioned immediately beneath the horizontal guide rails 252. This plate 275 is provided with a suitable recess or aperture 276 through which the shaft 67a may project above and below the plate. The plate 275 supports a pair of rollers 277 arranged to engage the guide rails 252 so as to guide the upper portion of the housing structure 255.

While not illustrated in Figure 23 for purposes of clarity, it is to be understood that the housing 255 may be provided with suitable brackets for supporting the spray guns such as the spray guns 161 and 162 for coating the portion of the exterior of articles such as the hollow articles 48.

It will be recal'ed that in connection with the previous embodiment the U-shaped member 147 engaged the article supporting member 32 so that the movement of the conveyor chain 31 moves the carriage 68 against the action of the spring contained member 155. When the rollers attached to the member 147 reached a certain point in the slot 149 of the member 151 the article supporting members 32 were disengaged whereupon the spring 155 returned the carriage to its position. In the embodiment shown in Figures 23 to 27 the cross members 273 correspond to the U-shaped member 147 of Figure 10 and the rollers 274 travel in the apertures 254 until the outwardly extending portion is reached whereupon the forward ends of the transverse members 273 are disengaged from the supports 32. When this occurs the energy stored in the member 155a returns the carriage 255 and associated apparatus to its original starting position so that the spray guns associated with the carriage 255 may coat the articles such as the articles 48 supported upon the support 32. It of course is understood that the spray gun control mechanism such as shown in the previous figures and heretofore described is utilized to control the operation of the spray guns associated with the carriage 255 so that the guns are properly operated in accordance with the condition of the support 32 as to whether or not a member 48 is supported thereon.

While for the purpose of illustrating and describing the present invention, a particular embodiment has been shown, it is to be understood that the invention is not to be limited thereto since obviously such variations in the instrumentalities employed and in their arrangements may be made as are commensurate with the scope of the invention defined in the appended claims.

This invention is hereby claimed as follows:

1. In a spraying apparatus including a conveyor having a plurality of equally spaced article supports rotatably mounted thereon, a spraying chamber having a plurality of movably mounted spray guns therein each positioned to coat different surfaces of said articles, a pivotaly mounted finger member adjacent the entrance of said spraying chamber for detecting vacant article supports, a control means mounted adjacent said member for actuating the spray guns in the spraying operation, said control means having pivotally mounted cam actuators mounted about the periphery thereof, said cam actuators protruding radially beyond the peripheral boundary of said control member when in operative position, said member having means theron to move said cam actuators to the ineffective position in the absence of articles on said spaced article supports, means for coordinating periodically and repeatedly the movements of said spray guns with the movements of said articles through said chamber, and means for rotating said article supports during the spraying operation.

2. A sprayer apparatus for applying a protective coating to the surfaces of hollow articles comprising a flexible conveying element provided with spaced rotatable supports for articles to be coated, a spraying chamber, a movably mounted carriage within said chamber having a plurality of spray guns mounted thereon and for coating the different surfaces of said articles, detector means at the entrance to said chamber for detecting vacant article supports, means rotatably mounted adjacent to said detector means having cam actuators mounted thereon and operatively positioned by said detector means, said second means controlling the actuation of each of said spray guns in succession, means for coordinating the movement of said carriage with the movement of said articles through said chamber and including an arm extending from said carriage to engage said supports on said conveyor for a predetermined distance, and means to return said carriage to its original position, said control means operating said spray guns in synchronism with the relative position of said article supports and said spray guns.

3. An apparatus for applying a coating to surfaces of articles comprising an endless conveyor provided with spaced supports for articles to be coated, movably mounted spraying means arranged to coat surface portions of said articles, article detecting control means arranged adjacent said spraying means for controlling the actuation of said spraying means in accordance with the condition of said article supports, and means operative to move said spraying means in coordination with the movement of said article supports.

4. Apparatus for applying a coating to the surfaces of articles comprising a continuous conveying element provided with spaced rotatable supports for carrying said articles to be coated, a spraying chamber having movably mounted spraying means arranged to coat various surfaces of said articles, means arranged at the entrance to said chamber for detecting vacant article supports, means responsive to said detecting means adapted to control the actuation of said spraying means, and means for coordinating the movement of said spray guns with the movement of said articles through said chamber.

5. An apparatus for applying a coating to the surfaces of articles comprising a continuous conveying element provided with spaced rotatable supports for carrying said articles to be coated, a spraying chamber having movably mounted spraying means arranged to coat various surfaces of said articles, means arranged at the entrance to said chamber for detecting vacant article supports, means responsive to said detecting means adapted to control the actuation of said spraying means, means for coordinating the movement of said spraying means with the movement of said articles through said chamber, and means for rotating said article supports as they pass through said chamber.

6. An apparatus for applying a coating to surfaces of articles comprising an endless conveyor provided with spaced supports for articles to be coated, said conveyor having a portion thereof moving in a rectilinear path, movably mounted spraying means positioned adjacent said rectilinear portion of the conveyor and arranged to coat surface portions of said articles, article detecting control means arranged adjacent said spraying means for controlling the actuation of said spraying means in accordance with the condition of said article supports, and means operative to move said spraying means in a rectilinear path beside said rectilinear portion of the conveyor in coordination with the movement of said article supports.

7. An apparatus for applying a coating to the surfaces of articles comprising a continuous conveying element provided with spaced rotatable supports for carrying articles to be coated, a spraying chamber having movably mounted spraying means arranged to coat various surfaces of said articles, said conveying element having a rectilinear portion disposed within said spraying chamber, means arranged at the entrance to said chamber for detecting vacant article supports, means responsive to said detecting means adapted to control the actuation of said spraying means, means for moving spraying means in a rectilinear path parallel to the rectilinear portion of said conveying element, means for coordinating the movement of said spraying means with the movement of said articles through said chamber, and means for rotating said article supports as they pass through said chamber.

8. In spraying apparatus including a conveyor having a plurality of spaced apart article supports, said conveyor having a portion thereof directed in a rectilinear path, a movable carriage positioned adjacent said rectilinear portion of the conveyor and adapted to move in a rectilinear path in a direction substantially parallel to said rectilinear portion, spraying means mounted upon said carriage, means positioned on said carriage adapted to engage said conveyor whereby to move said carriage in synchronism with said conveyor, said engaging means being adapted to be released from engagement with said conveyor after a predetermined amount of movement of said carriage, and means for returning said carriage to its original starting position.

9. In spraying apparatus including a conveyor having a plurality of spaced apart article supports, said conveyor having a portion thereof directed in a rectilinear path, a movable carriage positioned adjacent said rectilinear portion of the conveyor and adapted to move in a rectilinear path in a direction substantially parallel to said rectilinear portion, spraying means mounted upon said carriage, means positioned on said carriage adapted to engage said article support whereby to move said carriage in synchronism with said conveyor along a rectilinear path, means for retracting said article support engaging means from the engaging position, and means for returning said carriage to its original starting position.

10. In spraying apparatus including a conveyor having a plurality of spaced apart article supports, said conveyor having a portion thereof directed in a rectilinear path, a movable carriage positioned adjacent said rectilinear portion of the conveyor for movement in a rectilinear path in a direction substantially parallel to said rectilinear portion, spraying means movably mounted upon said carriage, means for imparting a vertical movement to said spraying means in synchronism with the rectilinear movement of said carriage, means positioned on said carriage to engage said conveyor whereby to move said carriage in synchronism with said conveyor, said engaging means being releasable from engagement with said conveyor after a predetermined amount of movement of said carriage, and means for returning said carriage to its original starting position.

11. A spraying apparatus for applying a coating to articles on a continuous conveyor while rotated thereon and including a conveyor having a plurality of equally spaced article supports rotatably mounted thereon, a spraying chamber having a plurality of movably mounted spray guns, a detector member mounted adjacent the entrance of said spraying chamber for detecting vacant article supports, a control means responsive to said detector member and mounted adjacent the said member for controlling the actuation of said spray guns in accordance with the condition of said detector member, said control means having pivotally mounted cam actuators positioned about the periphery thereof, said cam actuators having an operative and an inoperative position, said cam actuators in operative position protruding radially beyond the periphery of said control means and remaining within the periphery of said control means when in inoperative position, and means for coordinating the movement of said spray guns with the movement of said articles through said chamber.

12. In an apparatus for spraying articles, a continuous conveyor, a plurality of equally spaced article supports rotatably mounted on said conveyor, a plurality of spray guns, a carriage for said spray guns movable in a path parallel to said conveyor, a detector member mounted adjacent said conveyor for detecting vacant article supports, a control means mounted adjacent said detector member for controlling the actuation of said spray guns in accordance with the condition of said article supports, said control means including a rotatably mounted disc with a plurality of two-position cam actuators pivotally mounted thereon, each of said cam actuators being shiftable to occupy either an effective or an ineffective position, said detector member having means thereon for moving said cam actuators to the ineffective position in the absence of articles on said spaced article supports, and means for coordinating movement of said spray guns with the movement of said articles through said chamber.

13. In a spraying apparatus, a continuous conveyor having a plurality of spaced article supports rotatably mounted thereon, a plurality of spray guns, a carriage for said spray guns mounted for movement in a path parallel to said conveyor, a support mounted on said carriage for movement periodically between elevated and lowered positions relative to said carriage, means for moving said carriage and said support in timed relation relative to each other, a detector member mounted adjacent said conveyor for detecting vacant article supports, a control means responsive to said detector member and mounted adjacent the same for controlling the actuation of said spray guns in accordance with the position of said detector member, said control means having a plurality of two-position cam actuators pivotally mounted thereon, said carriage having means for engaging said conveyor to thereby move the carriage through a predetermined distance.

JENS A. PAASCHE.

REFERENCES CITED

The following references are of record in the file of this patent:

UNITED STATES PATENTS

| Number | Name | Date |
|---|---|---|
| 1,889,676 | Little | Nov. 29, 1932 |
| 2,048,937 | Larson | July 28, 1936 |
| 2,069,844 | Paasche | Feb. 9, 1937 |
| 2,081,945 | Massey et al. | June 1, 1937 |
| 2,088,542 | Westin | July 27, 1937 |
| 2,149,293 | Howlett | Mar. 7, 1939 |
| 2,210,187 | Ross | Aug. 6, 1940 |
| 2,259,935 | Johnson | Oct. 21, 1941 |
| 2,271,442 | Sanborn | Jan. 27, 1942 |
| 2,342,375 | Shurley | Feb. 22, 1944 |
| 2,376,980 | Petersen et al. | May 29, 1945 |
| 2,383,023 | Sykes et al. | Aug. 21, 1945 |